United States Patent
Kezys (10) Patent No.: US 8,868,082 B2
(45) Date of Patent: *Oct. 21, 2014

(54) ADJUSTING COVERAGE REGIONS OF WIRELESS ACCESS POINTS SERVING AS HANDOFF INDICATION MECHANISM IN WIRELESS LOCAL AREA NETWORKS

(75) Inventor: Vytautas Robertas Kezys, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,584

(22) Filed: Jan. 17, 2012

(65) Prior Publication Data

US 2012/0120918 A1 May 17, 2012

Related U.S. Application Data

(63) Continuation of application No. 13/070,647, filed on Mar. 24, 2011, now Pat. No. 8,121,648, which is a continuation of application No. 12/700,118, filed on Feb. 4, 2010, now Pat. No. 7,936,724, which is a continuation of application No. 11/743,741, filed on May 3, 2007, now Pat. No. 7,684,370.

(51) Int. Cl.
| | |
|---|---|
| *H04M 1/00* | (2006.01) |
| *H04W 24/02* | (2009.01) |
| *H04W 16/18* | (2009.01) |
| *H04W 28/08* | (2009.01) |
| *H04W 36/00* | (2009.01) |

(52) U.S. Cl.
CPC .............. *H04W 24/02* (2013.01); *H04W 16/18* (2013.01); *H04W 28/08* (2013.01); *H04W 36/0083* (2013.01)
USPC ............ 455/443; 455/436; 455/444; 370/334

(58) Field of Classification Search
USPC ...................... 455/436–444, 560, 561–562.1
See application file for complete search history.

(56) References Cited

U.S. PATENT DOCUMENTS

| | | |
|---|---|---|
| 5,715,516 A | 2/1998 | Howard et al. |
| 6,956,527 B2 | 10/2005 | Rogers et al. |

(Continued)

FOREIGN PATENT DOCUMENTS

| | | |
|---|---|---|
| EP | 1152628 A1 | 11/2001 |
| EP | 1876759 A1 | 1/2008 |

(Continued)

OTHER PUBLICATIONS

European Search Report & Written Opinion for EP Application 07107452.0, Date Oct. 16, 2007.

(Continued)

*Primary Examiner* — Lester Kincaid
*Assistant Examiner* — Dung Lam
(74) *Attorney, Agent, or Firm* — Integral Intellectual Property Inc.; Miriam Paton (57) ABSTRACT

A mobile communication device includes a processor and a communication subsystem coupled to the processor. The communication subsystem is configured to provide the mobile device with wireless communications via an access point of a wireless network. The mobile device communicates with the access point via the communication subsystem for adjusting boundaries of an RF coverage region of the access point. The mobile device subsequently communicates with the access point via the communication subsystem in the adjusted RF coverage region for handoff to another wireless network, while the access point serves as part of a handoff indication mechanism in the wireless network.

14 Claims, 9 Drawing Sheets

(56) References Cited

U.S. PATENT DOCUMENTS

| | | |
|---|---|---|
| 6,965,576 B1 | 11/2005 | Lee et al. |
| 6,980,527 B1 | 12/2005 | Liu et al. |
| 7,493,127 B2 | 2/2009 | Morgan et al. |
| 7,536,186 B2 | 5/2009 | Dorenbosch et al. |
| 7,684,370 B2 | 3/2010 | Kezys |
| 7,936,724 B2 | 5/2011 | Kezys |
| 2004/0009792 A1 | 1/2004 | Weigand |
| 2004/0170122 A1 | 9/2004 | Guo et al. |
| 2004/0192211 A1 | 9/2004 | Gallagher et al. |
| 2004/0229621 A1* | 11/2004 | Misra .............................. 455/445 |
| 2005/0048972 A1 | 3/2005 | Dorenbosch et al. |
| 2006/0111149 A1* | 5/2006 | Chitrapu et al. ........... 455/562.1 |
| 2006/0221920 A1 | 10/2006 | Gopalakrishnan et al. |
| 2006/0287016 A1 | 12/2006 | Portaro et al. |
| 2007/0026807 A1 | 2/2007 | Kish |
| 2008/0008143 A1 | 1/2008 | Robertson et al. |
| 2008/0144528 A1 | 6/2008 | Graves et al. |
| 2008/0182565 A1 | 7/2008 | Lazaridis et al. |
| 2009/0111469 A1 | 4/2009 | Lee et al. |
| 2009/0154426 A1 | 6/2009 | Perraud et al. |
| 2013/0109387 A1* | 5/2013 | Tinnakornsrisuphap et al. .............................. 455/436 |
| 2013/0189999 A1* | 7/2013 | Nakata .......................... 455/446 |

FOREIGN PATENT DOCUMENTS

| | | |
|---|---|---|
| WO | 2006026117 A2 | 3/2006 |
| WO | 2006057679 A2 | 6/2006 |

OTHER PUBLICATIONS

European Search Report & Written Opinion for EP Application 10157501.7, Date Apr. 23, 2010.

* cited by examiner

ADJUSTING COVERAGE REGIONS OF WIRELESS ACCESS POINTS SERVING AS HANDOFF INDICATION MECHANISM IN WIRELESS LOCAL AREA NETWORKS

CROSS REFERENCE TO RELATED APPLICATIONS

This application is a continuation of and claims priority to U.S. non-provisional patent application having application Ser. No. 13/070,647 and filing date of 24 Mar. 2011, now U.S. Pat. No. 8,121,648 B2, which is a continuation of and claims priority to U.S. non-provisional patent application having application Ser. No. 12/700,118 and filing date of 4 Feb. 2010, now U.S. Pat. No. 7,936,724 B2, which is a continuation of and claims priority to U.S. non-provisional patent application having application Ser. No. 11/743,741 and filing date of 3 May 2007, now U.S. Pat. No. 7,684,370 B2, each application being hereby incorporated by reference herein.

BACKGROUND

1. Field of the Technology

The present disclosure relates generally to wireless access points (APs) in wireless local area networks (WLANs), and more particularly to adaptive beamforming configuration methods and apparatus for wireless APs which serve as tripwires in WLANs.

2. Description of the Related Art

A mobile communication device may be designed to operate on two different types of heterogeneous wireless networks, such as a wireless local area network (WLAN) (e.g. IEEE 802.11 based wireless network) and a wireless wide area network (WWAN) (e.g. a cellular telecommunications network). With these types of mobile communication devices, it is convenient to have advance notice of when the mobile device will be handed-off from the WLAN to the WWAN, so that voice communication sessions of the mobile device may be seamlessly maintained during the handoff. For example, if the mobile device and/or network may be made aware in advance that the mobile device is about to leave the WLAN, a connection may be established between the mobile device and the WWAN before the connection with the WLAN is lost. For this reason, a wireless access point (AP) may be deployed specifically to cover regions of ingress and/or egress of the WLAN and serve as a "tripwire" to provide such advance handoff notice. If such AP tripwires had suitable coverage regions that could be easily configured, the reliability and timeliness of handoffs may be enhanced.

Accordingly, what are needed are methods and apparatus to improve handoffs for mobile devices as described.

BRIEF DESCRIPTION OF THE DRAWINGS

Embodiments of the present disclosure will now be described, by way of example only, with reference to the attached figures. Same reference numerals are used in different figures to denote similar elements.

DETAILED DESCRIPTION OF THE PREFERRED EMBODIMENTS

Methods and apparatus for use in configuring a wireless access point (AP) which serves as a handoff indication mechanism ("AP tripwire") in a wireless local area network (WLAN) for mobile device handoffs between the WLAN and a wireless wide area network (WWAN) are described. During a configuration procedure or "training mode" of operation for the wireless AP, radio frequency (RF) signals transmitted from a plurality of communication devices are received by the wireless AP. The plurality of communication devices include a first group of communication devices positioned at locations of undesired RF coverage of the AP tripwire, outside of an RF coverage boundary of a WLAN coverage region of one or more other wireless APs of the WLAN, as well as a second group of communication devices positioned at locations of desired RF coverage of the AP tripwire, around the RF coverage boundary of the WLAN coverage region. Based on the received RF signals, wireless transceiver parameters of the wireless AP are automatically determined and set to adjust boundaries of an RF coverage region, such that RF signal coverage of the first group of communication devices is minimized but RF signal coverage of the second group of communication devices is maximized. Preferably, the wireless transceiver parameters are determined through use of an adaptive beamforming technique (e.g. a "minimax optimization"), which is performed automatically by the wireless AP during the configuration procedure without user intervention. After the configuration procedure, the wireless AP operates with use of the configured wireless transceiver parameters in a normal, steady-state mode of operation as the AP tripwire of the WLAN. Advantageously, the RF signal coverage of the AP tripwire is appropriately adjusted and set so as to help provide reliable and timely mobile device handoffs between the WLAN and the WWAN.

Figure 1:
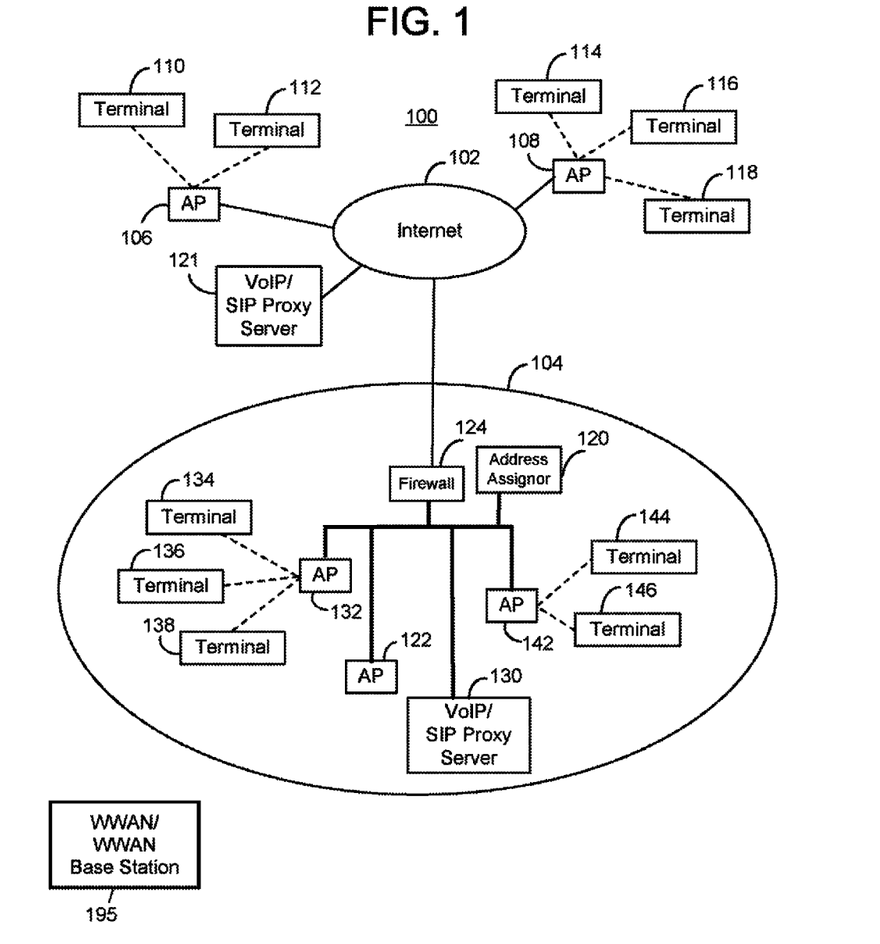
FIG. 1 is a block diagram which illustrates a communication system which includes a plurality of mobile communication devices and one or more wireless communication networks (e.g. WLANs)

To illustrate basic network architecture, FIG. 1 is a block diagram which illustrates a communication system 100 which includes a public network 102 (e.g. the Internet) and a private network 104. In the present embodiment, private network 104 is or includes a wireless local area network (WLAN). In the WLAN, terminals may connect to their associated networks through access points (APs) as shown. Preferably, at least some of the APs are wireless APs of the WLAN and at least some of the terminals are mobile/wireless communication devices which interface and connect through these wireless APs. Such terminals and APs may operate in accordance with well-known IEEE 802.11 standards. The terminals shown in public network 102 include terminals 110 and 112 which have interfaced with AP 106, and terminals 114, 116, and 118 which have interfaced with AP 108. The terminals shown in private network 104 include terminals 134, 136, 138 which have interfaced with AP 132, and terminals 144 and 146 which have interfaced with AP 142.

Private network 104 which includes the WLAN provides various data and communication services to its terminals. For example, private network 104 may provide for voice telephony communication services for its terminals with use of Voice over IP (VoIP) communications. For these types of services, private network 104 may utilize a VoIP server architecture for VoIP communication sessions, and/or an e-mail server architecture for e-mail message communications, as examples. For these purposes, communication system 100 may also include at least one VoIP or Session Initiation Protocol (SIP) proxy server. In the present embodiment, communication system 100 has a VoIP or SIP proxy server 121 in public network 102 and a VoIP or SIP proxy server 130 in private network 104. Note that some communication applications utilized by terminals, such VoIP applications, require the use of SIP. SIP is well-documented in standard documents such as Request For Comments (RFC) 3261. A firewall 124 may also be provided in private network 104 for preventing unauthorized access from users in public network 102.

Outside of the networks 102 and 104 is a wireless wide area network (WWAN) 195 which may be a cellular telecommunication network which includes a plurality of base stations. At least some of the terminals of FIG. 1 are adapted to operate in both the WLAN and the WWAN. As apparent, the illustrative example of the present disclosure is directed to WLANs of the IEEE 802.11 network type and WWANs of the cellular network type. Note, however, that the WLAN and WWANs may be any suitable heterogeneous networks. For example, one of the networks may be a WiMAX (e.g. 802.16-based) network. If the WLAN is a WiMAX network, for example, then the WWAN may be a cellular telecommunications network. Also for example, if the WWAN is a WiMAX network, then the WLAN may be an IEEE 802.11-based network. Other variations are possible as well.

Figure 2:
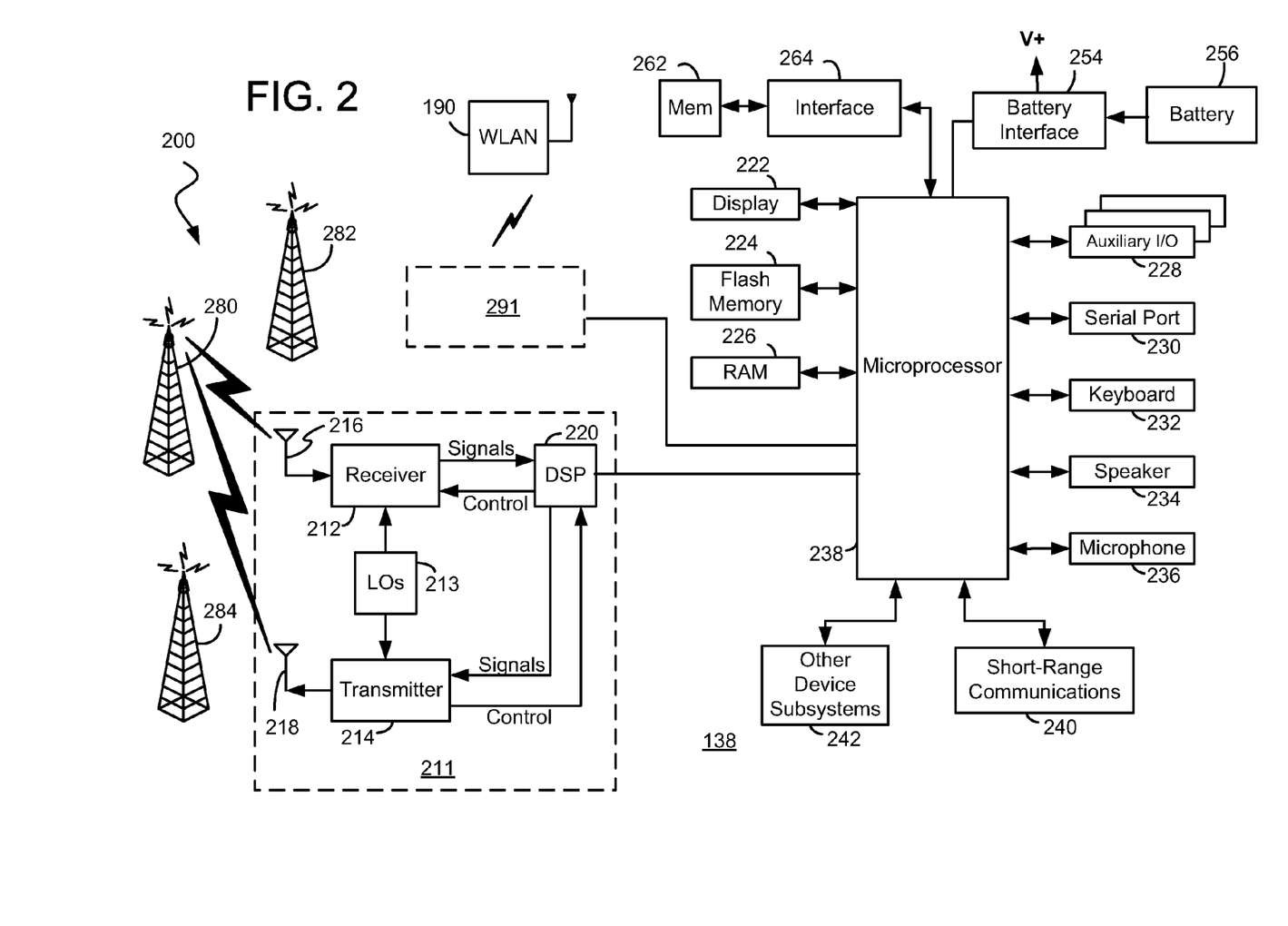
FIG. 2 is a more detailed schematic diagram of the mobile communication devices of FIG. 1, namely, a mobile station of the preferred embodiment.

Referring now to FIG. 2, electrical components of a typical mobile terminal 138 (e.g. a mobile communication device or mobile station) will be described. Terminal 138 is adapted to operate in connection with the wireless APs of communication system 100 of FIG. 1 (e.g. a WLAN 190 of FIG. 2) as well as a WWAN (e.g. a cellular telecommunications network). Terminal 138 is preferably a two-way mobile communication device having at least voice and advanced data communication capabilities, including the capability to communicate with other computer systems. Depending on the functionality provided by terminal 138, it may be referred to as a data messaging device, a two-way pager, a cellular telephone with data messaging capabilities, a wireless Internet appliance, or a data communication device (with or without telephony capabilities).

As described, terminal 138 is adapted to wirelessly communicate with WLAN 190. Also as shown, terminal 138 may be adapted to wirelessly communicate with cellular base station transceiver systems 200. For communication with cellular networks, terminal 138 utilizes communication subsystem 211. For communication with WLANs, terminal 138 utilizes an additional communication subsystem 291 which has the same or similar structural components as communication subsystem 211. With such configuration, terminal 138 may be referred to as a "dual mode" mobile station. Although shown in FIG. 2 as having separate and independent subsystems, at least some portions or components of these otherwise different subsystems may be shared where possible.

Communication subsystem 211 includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108a and antenna 110a shown in FIG. 1. As will be apparent to those skilled in field of communications, particular design of communication subsystem 211 depends on the communication network in which terminal 138 is intended to operate.

Terminal 138 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of terminal 138, and therefore terminal 138 requires a memory module 262, such as a Subscriber Identity Module or "SIM" card, a Universal SIM (U-SIM), or a Removable User Identity Module (R-UIM), to be inserted in or connected to an interface 264 of terminal 138 in order to operate in the network. Since terminal 138 is a mobile battery-powered device, it also includes a battery interface 254 for receiving one or more rechargeable batteries 256. Such a battery 256 provides electrical power to most if not all electrical circuitry in terminal 138, and battery interface 254 provides for a mechanical and electrical connection for it. Battery interface 254 is coupled to a regulator (not shown in FIG. 2) that provides a regulated voltage V+ to all of the circuitry.

Terminal 138 includes a microprocessor 238 that controls overall operation of terminal 138. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on terminal 138. A predetermined set of applications that control basic device operations, including at least data and voice communication applications, will normally be installed on terminal 138 during its manufacture. A preferred application that may be loaded onto terminal 138 may be a personal information manager (PIM) application having the ability to organize and manage data items relating to user such as, but not limited to, e-mail, calendar events, voice mails, appointments, and task items. Naturally, one or more memory stores are available on terminal 138 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on terminal 138 with respect to such items. This is especially advantageous where the host computer system is the wireless device user's office computer system. Additional applications may also be loaded onto terminal 138 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of terminal 138 and may provide enhanced on-device functions, communication-related functions, or both. For example, secure communication applications may enable electronic commerce functions and other such financial transactions to be performed using terminal 138.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of terminal 138 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of terminal 138 is substantially similar, except that the received signals would be output to speaker 234 and signals for transmission would be generated by microphone 236. Alternative voice or audio I/O subsystems, such as a voice message recording subsystem, may also be implemented on terminal 138. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of terminal 138 by providing for information or software downloads to terminal 138 other than through a wireless communication network. The alternate download path may, for example, be used to load an encryption key onto terminal 138 through a direct and thus reliable and trusted connection to thereby provide secure device communication. Short-range communications subsystem 240 of FIG. 2 is an additional optional component that provides for communication between terminal 138 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Figure 3:
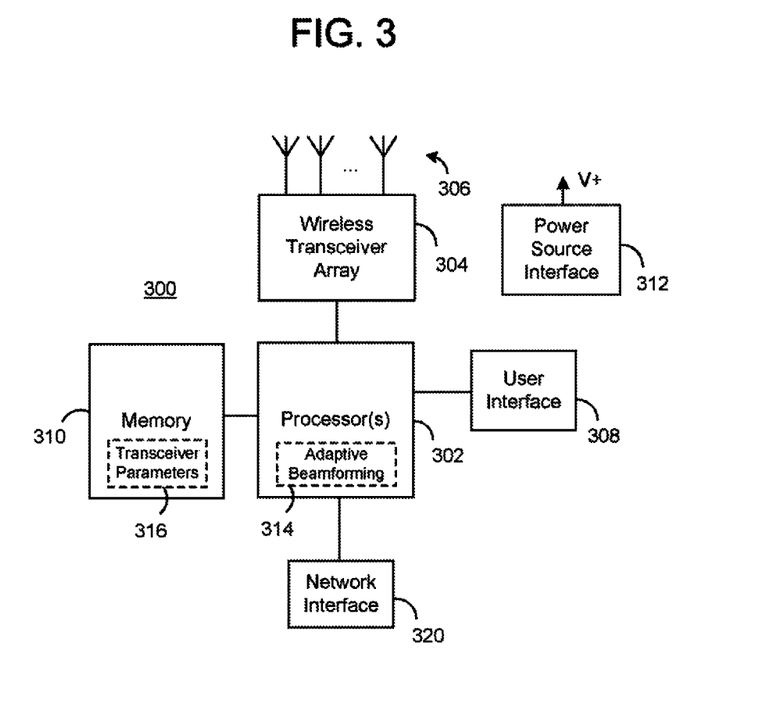
FIG. 3 is a schematic block diagram of basic components of a wireless access point which may serve as a handoff indication mechanism in the WLAN.

FIG. 3 is a schematic block diagram of basic components of a wireless access point (AP) 300 which serves as a handoff indication mechanism or AP tripwire in a wireless local area network (WLAN). Wireless AP 300 is adapted to engage in a configuration procedure in a "training mode" of operation with use of an adaptive beamforming technique, which is executed prior to its use as a handoff indication mechanism.

As shown in FIG. 3, wireless AP 300 includes a processor 302 (e.g. a microprocessor, microcontroller, and/or digital signal processor), memory 310 coupled to processor 302, a wireless transceiver array 304 coupled to processor 302, an antenna array 306 coupled to wireless transceiver array 304, a user interface 312 coupled to processor 302, and a power source interface 314. Although only one processor 302 is shown in FIG. 3, processor 302 may be embodied as two or more processors (e.g. microprocessor and DSP) and wireless transceiver array 304 may be embodied as two or more wireless transceiver portions. Power source interface 314 supplies power to all electrical components of wireless AP 300 by interfacing with a power source (e.g. AC power, battery, and/ or solar power). A network communication interface 320 is coupled to processor 302 and provided for interfacing wireless AP 300 with the WLAN. Network interface 302 may be a wired communication interface, such as an Ethernet communication interface.

Processor 302 of wireless AP 300 includes an adaptive beamforming process 314 (e.g. a minimax optimization process) which helps determine transceiver parameters 316 for wireless transceiver array 304 during the configuration procedure. Such transceiver parameters 316 are set and stored in memory 310 for subsequent use during normal steady-state operation of wireless AP 300 as the handoff indication mechanism or AP tripwire. Adaptive beamforming process 314 may be embodied as computer instructions which are executable by processor 302. Transceiver parameters 316 are used by wireless AP 300 to establish its RF coverage region while serving as the handoff indication mechanism in the WLAN. If necessary (e.g. in a wideband environment such as an OFDM systems), a set of transceiver parameters 316 may be stored for each frequency or frequency pair associated with all of the usable frequency channels of the relevant RF band for RF communications. The basic components of wireless AP 300 of FIG. 3 may be particularly utilized as will be described later in relation to FIGS. 5-9. User interface 312, which may be or include user actuable switches or keys (e.g. directly on a housing of wireless AP 300 or through a computer terminal (e.g. PC) connected to wireless AP 300), for example, may be utilized to initiate the configuration procedure and adaptive beamforming process 314. That is, the configuration procedure/adaptive beamforming technique of wireless AP 300 may be initiated in response to a user interface signal from user interface 312, but thereafter adaptive beamforming process 314 operates automatically to determine transceiver parameters 316 for wireless AP 300 without further user intervention.

Figure 4:
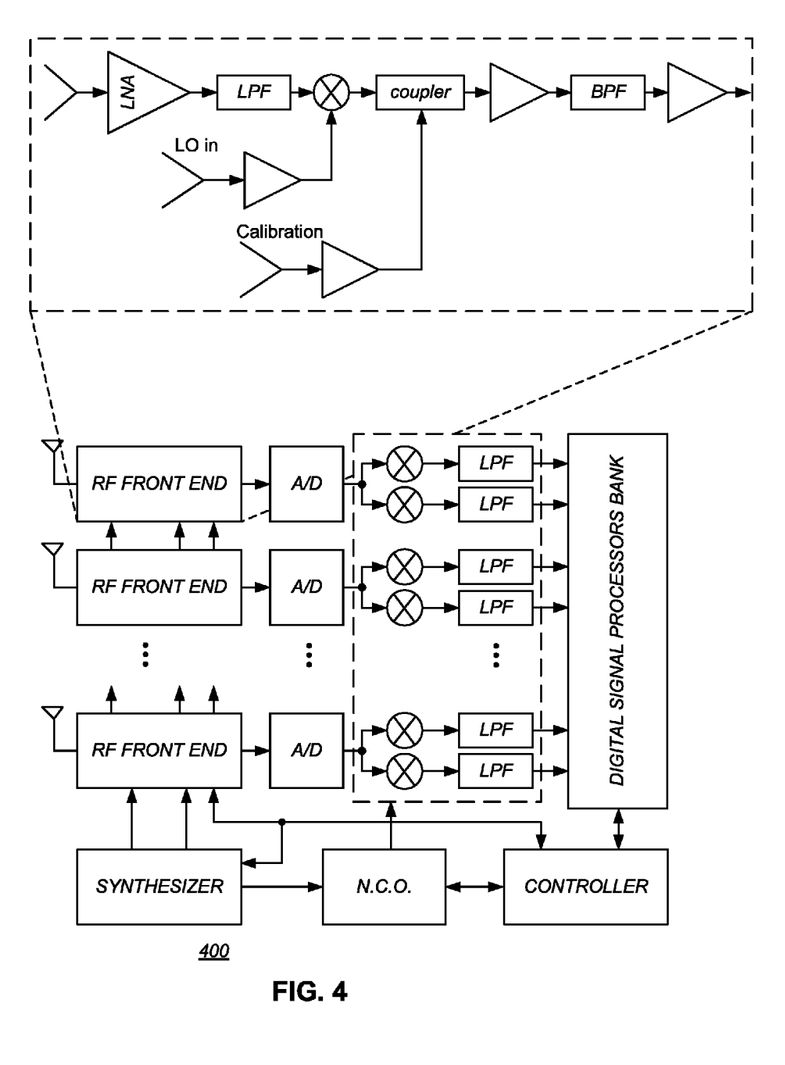
FIG. 4 is a schematic diagram of wireless transceiver components of the wireless access point of FIG. 3 which are adapted to perform an adaptive beamforming technique for configuration of the wireless access point.

Showing more exemplary detail, FIG. 4 is a schematic diagram of wireless transceiver components 400 of the wireless AP which are adapted to perform an adaptive beamforming technique for configuration of the wireless AP. In the example of FIG. 4, the receiver portion is shown but the transmitter portion may utilize a similar approach. In FIG. 4, wireless transceiver components 400 include an antenna array having a plurality of antennas, where each antenna is coupled to a separate corresponding RF front end component. A frequency synthesizer, which receives a fixed oscillator frequency signal from an oscillator ("NCO"), is coupled to each RF front end component. Each RF front end component has an output coupled to an input of an analog-to-digital converter (A/D), which has an output coupled to signal demodulators (which include signal mixers) and subsequent low pass filters. Outputs from the low pass filters are coupled to inputs of a digital signal processor (DSP). The controller serves to control the adaptive beamforming process for producing transceiver parameters in the configuration procedure for the DSP.

Note that there are many different types of adaptive beamforming algorithms, conventional or otherwise, which may be utilized within the wireless AP to obtain the desired result. In a preferred embodiment, a minimax optimization technique is performed in the configuration procedure. Using a minimax optimization technique, RF signals are minimized for those communication devices outside of the desired RF coverage region and maximized for those communication devices within the desired RF coverage region. In the present techniques, each RF signal is multiplied with complex weights that adjust a magnitude and a phase of the RF signal to and from each antenna in the antenna array. This causes the output of from the antenna array to form a transmit/receive beam in the desired direction, while minimizing the output in other directions. The application of complex weights to the RF signals from different antennas of the antenna array involves complex multiplications that may map onto embedded DSP blocks of the DSP.

Figure 6:
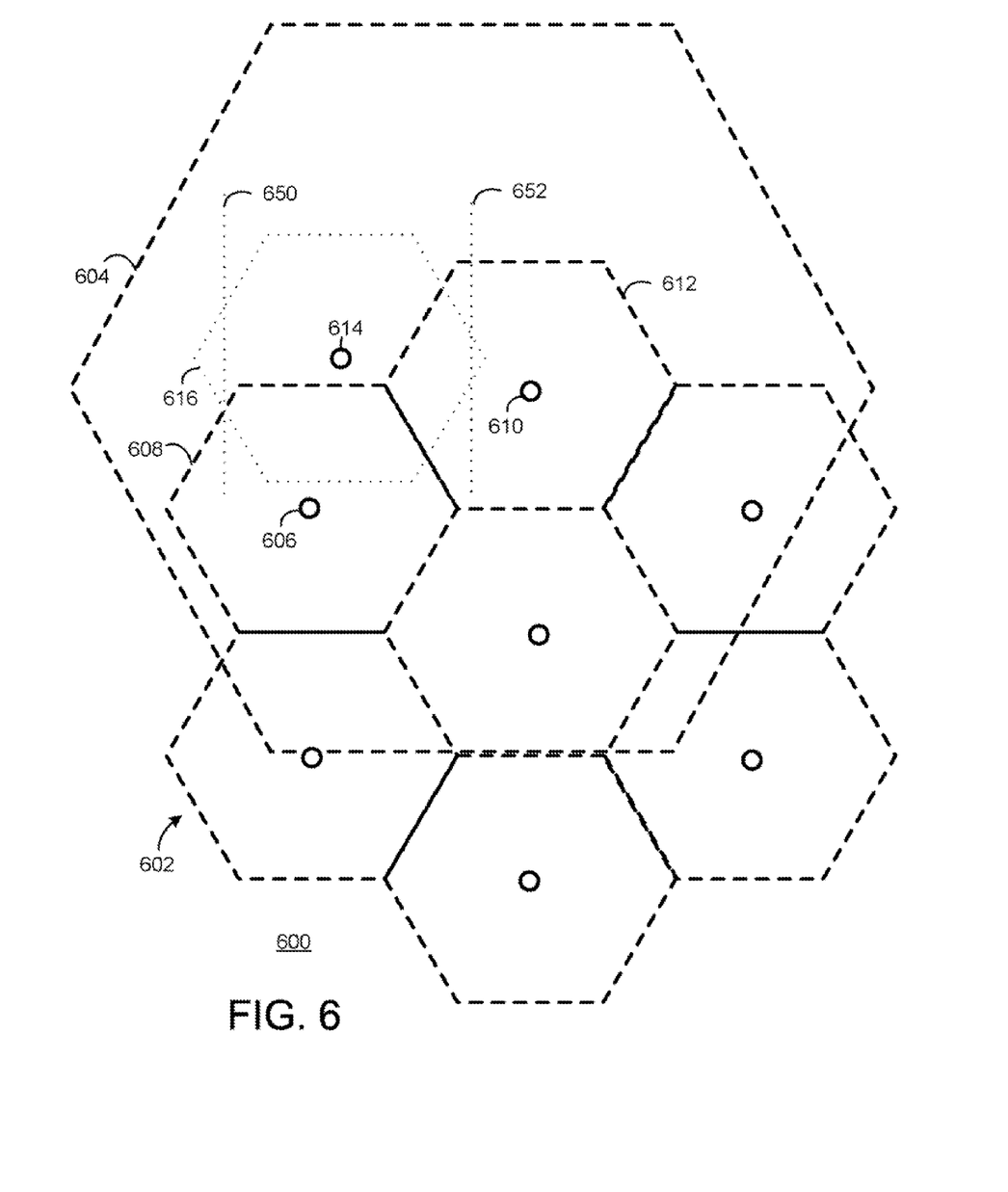
FIG. 6 is the first in a series of four illustrations of FIGS. 6-9 of the WLAN of the present disclosure, where a wireless access point that will serve as the handoff indication mechanism in the WLAN is shown located in a WLAN ingress/egress region.

Referring now ahead to FIG. 6, what is shown is the first in a series of four illustrations of FIGS. 6-9 of a WLAN 600 which utilizes techniques of the present disclosure. WLAN 600 has a plurality of wireless access points (APs) 602 which together provide a local radio frequency (RF) coverage region for WLAN 600. For example, as part of this local RF coverage region of WLAN 600, a wireless AP 606 provides an RF coverage region 608 and a wireless AP 610 provides an RF coverage region 612. When within the local RF coverage region of WLAN 600, mobile communication devices are provided with wireless communications and may access communication services within it. Outside of the RF coverage region of WLAN 600, mobile devices cannot communicate through or access services of WLAN 600. WLAN 600 and its mobile devices may operate according to IEEE 802.11-based communication standards.

A wireless wide area network (WWAN) such as a cellular telecommunications network may also be available to provide communication services for mobile devices, even when the mobile devices are outside of the local RF coverage area of WLAN 600. In FIG. 6, one RF coverage region 604 of a WWAN within which mobile devices may communicate is shown. As depicted, RF coverage region 604 of the WWAN overlaps with at least part of the local RF coverage region of WLAN 600. Examples of the WWAN as a digital cellular telecommunications network operating in accordance with a cellular telecommunication standard include a Global Systems for Mobile Communications (GSM) and General Packet Radio Service (GPRS) network, a Code Division Multiple Access (CDMA) network, or the International Mobile Telecommunications (IMT) family of Enhanced Data Rates for GSM Evolution (EDGE), Universal Mobile Telecommunication System (UMTS), or CDMA2000 network.

The mobile device may initially operate in a voice communication session in WLAN 600. If the mobile device is moved outside of the local RF coverage region of WLAN 600 during the voice communication session, the voice communication session will need to be "handed off" to the WWAN. Since WLAN 600 and the WWAN are two different heterogeneous wireless networks, this type of handoff may be referred to as a "vertical" handoff. Such vertical handoffs are needed particularly at ingress/egress regions of WLAN 600, or predetermined locations at which mobile devices are known to exit or leave WLAN 600. An ingress/egress region may be, for example, a region associated with an entrance/exit of a building within which WLAN 600 operates. In FIG. 6, the ingress/egress region for mobile devices exists between two dashed lines 650 and 652. If the mobile device is moved from RF coverage area 608 of WLAN 600 past the ingress/egress region (i.e. in a direction upwards in the drawing), a voice communication session of the mobile device will need to be handed off to the WWAN in its RF coverage region 604. Note, however, that RF coverage with WLAN 600 may be lost suddenly and undesirably disrupt the voice communication sessions without mechanisms in the network to assist in this process.

Therefore, a wireless AP 614 is provided in WLAN 600 to serve as a handoff indication mechanism or an "AP tripwire" in WLAN 600. In FIG. 6, wireless AP 614 has not yet been configured and has an RF coverage region that is not yet optimized for handoff indication purposes. Wireless AP 614 may utilize the components shown and described earlier in relation to FIGS. 3 and 4 for adaptive beamforming configuration prior to such AP tripwire operation.

For AP tripwire operation, wireless AP 614 is intentionally setup and positioned in the ingress/egress region of WLAN 600 (e.g. in between dashed lines 650 and 652). During steady-state operation of wireless AP 614 in WLAN 600, wireless AP 614 operates in what is referred to as a "handoff indication" mode of operation. When a mobile device is within an RF coverage region 616 of wireless AP 614, it is likely that the mobile device will be exiting or entering the RF coverage of WLAN 600. If the mobile device is exiting WLAN 600, then it may need to be handed-off to the WWAN in RF coverage area 604. Therefore, when the mobile device is within RF coverage region 616, wireless AP 614 causes a handoff indication to be sent to the mobile device, to WLAN 600, or to both, in order to assist in providing a more reliable and timely vertical handoff for the mobile device to the WWAN.

If RF coverage region 616 of wireless AP 614 is not suitably configured (as is shown in FIG. 6), however, then wireless AP 614 may cause the handoff indication to be sent wrongfully (e.g. false detection) or prematurely. On the other hand, if RF coverage region 616 is unsuitable then wireless AP 614 may cause the handoff indication to be provided too late (i.e. after the handoff procedure has been or should have been initiated) and not serve the purpose of providing adequate forewarning. For this reason, wireless AP 614 is adapted to operate in a configuration mode of operation to suitably configure and adjust boundaries of its RF coverage region 616 so that wireless AP 614 will provide a reliable and timely handoff indication during steady-state operation (i.e. during the handoff indication mode). Preferably, other adjacent "interior" wireless APs (e.g. wireless APs 606 and 610) are similarly adapted to configure and adjust boundaries of their associated RF coverage regions, so as to fill in "holes" or "gaps" in RF coverage in response to the resulting RF coverage region of wireless AP 614. This may be done in order to minimize false handoffs for mobile devices.

Figure 7:
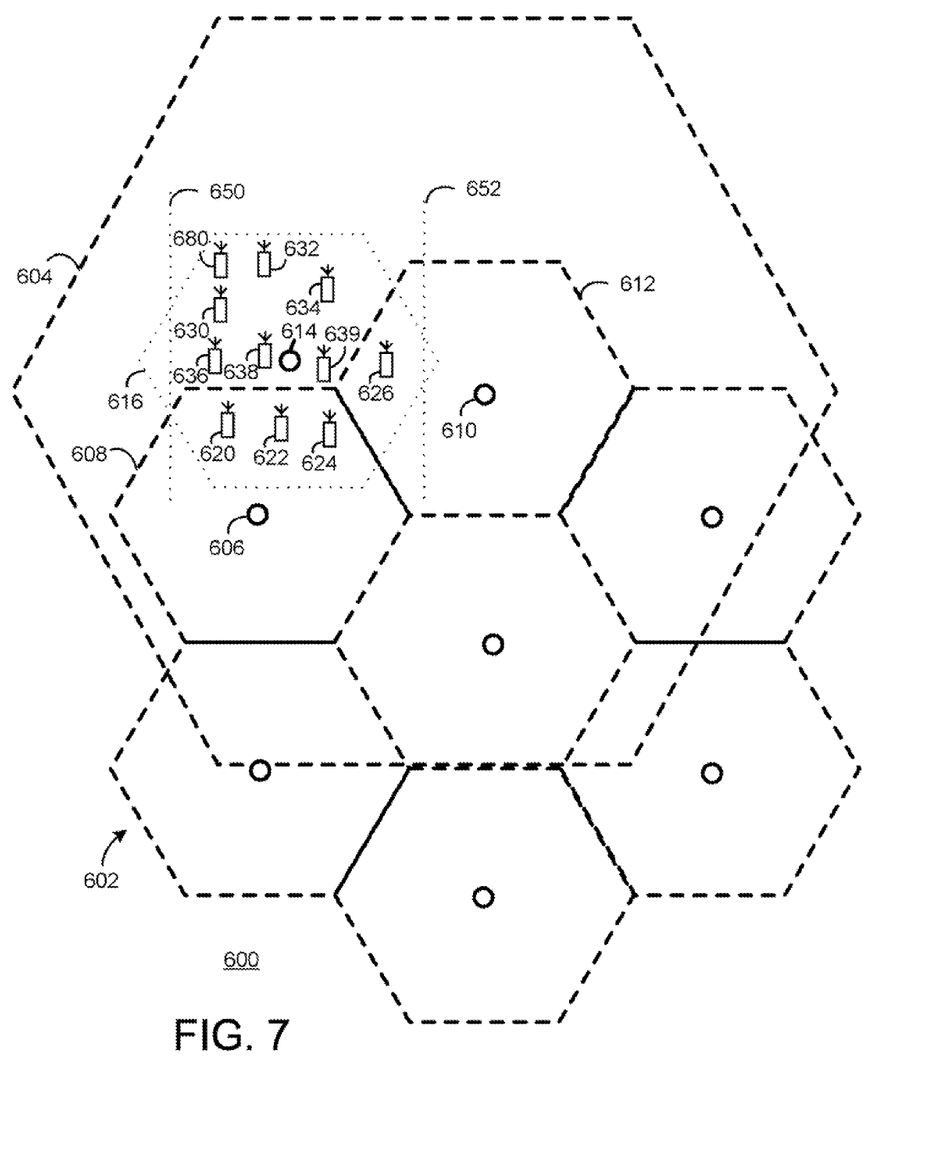
FIG. 7 is a second illustration of the WLAN of FIG. 6 where, during a configuration procedure of the wireless access point, a first group of communication devices are positioned at locations of undesired RF coverage of the AP tripwire, outside of an RF coverage boundary of a WLAN coverage region and a second group of communication devices are positioned at locations of desired RF coverage of the AP tripwire, around the RF coverage boundary of the WLAN coverage region.

FIG. 7 is a second illustration of WLAN 600 where a configuration procedure is being performed for wireless AP 614. As shown in FIG. 7, a plurality of communication devices are intentionally and strategically located around the ingress/egress region of WLAN 600 in a fixed position for the configuration procedure. These communication devices are used for the purpose of the configuration procedure, and subsequently removed for steady-state operation of wireless AP 614. In one approach, these communication devices are mobile devices which have the same or similar structure and functionality as mobile terminal 138 of FIG. 2 and are operational for end users as ordinary mobile communication devices. In another approach, the communication devices are specially-designed configuration devices which are not operational for end users as ordinary mobile communication devices. In the present example, the communication devices are mobile devices with the same or similar structure as mobile terminal 138 of FIG. 2.

As shown in FIG. 7, a first group of mobile devices 620, 622, 624, 626, 632, and 680 are positioned near the ingress/egress region at locations outside of a desired AP tripwire coverage (many of which are shown to be within an RF coverage boundary of WLAN 600 formed by RF coverage regions 608 and 612). On the other hand, a second group of mobile devices 630, 634, 636, 638, and 639 are positioned in the ingress/region at locations around and defining the desired AP tripwire coverage (many of which are shown to be along and outside the RF coverage boundary of WLAN 600 formed by RF coverage regions 608 and 612). Within the RF coverage boundary of WLAN 600, mobile devices may communicate with WLAN 600; outside of the RF coverage boundary of WLAN 600, mobile devices are unable to communicate with WLAN 600. Note that both the first and the second group of mobile devices are also located within RF coverage region 604 of the WWAN.

Each mobile device in FIG. 7 is associated with a mobile device identifier (e.g. an identification number, a telephone number, an IP address, etc.) that is unique to each device. Memory of wireless AP 614 may store each such mobile device identifier in association with indications for AP tripwire coverage. For example, each mobile device identifier may be stored in association with either a first indication corresponding to the first group of mobile devices that are within the RF coverage boundary of WLAN 600, or a second indication corresponding to the second group of mobile devices that are outside the RF coverage boundary of WLAN 600. These indications may be additionally or alternatively viewed as indications corresponding to whether or not AP tripwire coverage is desired or not desired. Through such associations, wireless AP 614 may be made aware which mobile devices should be included within the AP tripwire coverage.

The configuration procedure/adaptive beamforming technique of wireless AP 614 may be initiated in response to a user interface signal from a user interface. During the configuration procedure, where wireless AP 614 is operated in the configuration mode of operation, wireless AP 614 receives RF signals from the first group of mobile devices 620, 622, 624, 626, 632, and 680 and the second group of mobile devices 630, 634, 636, 638, and 639. Such communications may be performed for a particular frequency or frequency pair of the relevant RF band of interest for RF communications, or alternatively for two or more frequencies of the RF band in wideband environments (e.g. OFDM systems). RF signals received from each mobile device may include one or more messages which convey the mobile device identifier of the mobile device to wireless AP 614. Some of these mobile devices also transmit and receive RF signals to and from other "interior" wireless APs (e.g. wireless APs 606 and 610) when their positioning allows for it.

While receiving RF signals from the mobile devices, wireless AP 614 operates to automatically adjust and subsequently set boundaries of its RF coverage region 616 so as to minimize RF signal coverage for first group of mobile devices 620, 622, 624, 626, 632, and 680 but maximize RF signal coverage for second group of mobile devices 630, 634, 636, 638, and 639. Wireless AP 614 determines which RF signals should be maximized or minimized based on both the mobile device identifier associated with the RF signal and the indication of whether the mobile device should be within or outside the AP tripwire coverage. More specifically, a minimax optimization technique may be utilized during the configuration procedure. With use of the minimax optimization technique, RF signals are minimized for those communication devices outside of the desired RF coverage region and maximized for those communication devices within the desired RF coverage region.

During the configuration procedure, wireless transceiver parameters associated with wireless AP 614 are varied for each antenna element of the antenna array and subsequently set in place. Once obtained, the parameters are stored in memory of wireless AP 614 for its subsequent use in the handoff indication mode of WLAN 600. See the previous discussion in relation to FIGS. 3 and 4. Again, in a wideband environment (e.g. OFDM systems) this procedure may be repeated for multiple frequency channels (e.g. each and every frequency channel) utilized between wireless AP 614 and mobile devices for RF communications, assuming there is some frequency dependence for RF communications in the relevant RF band of interest.

Figure 8:
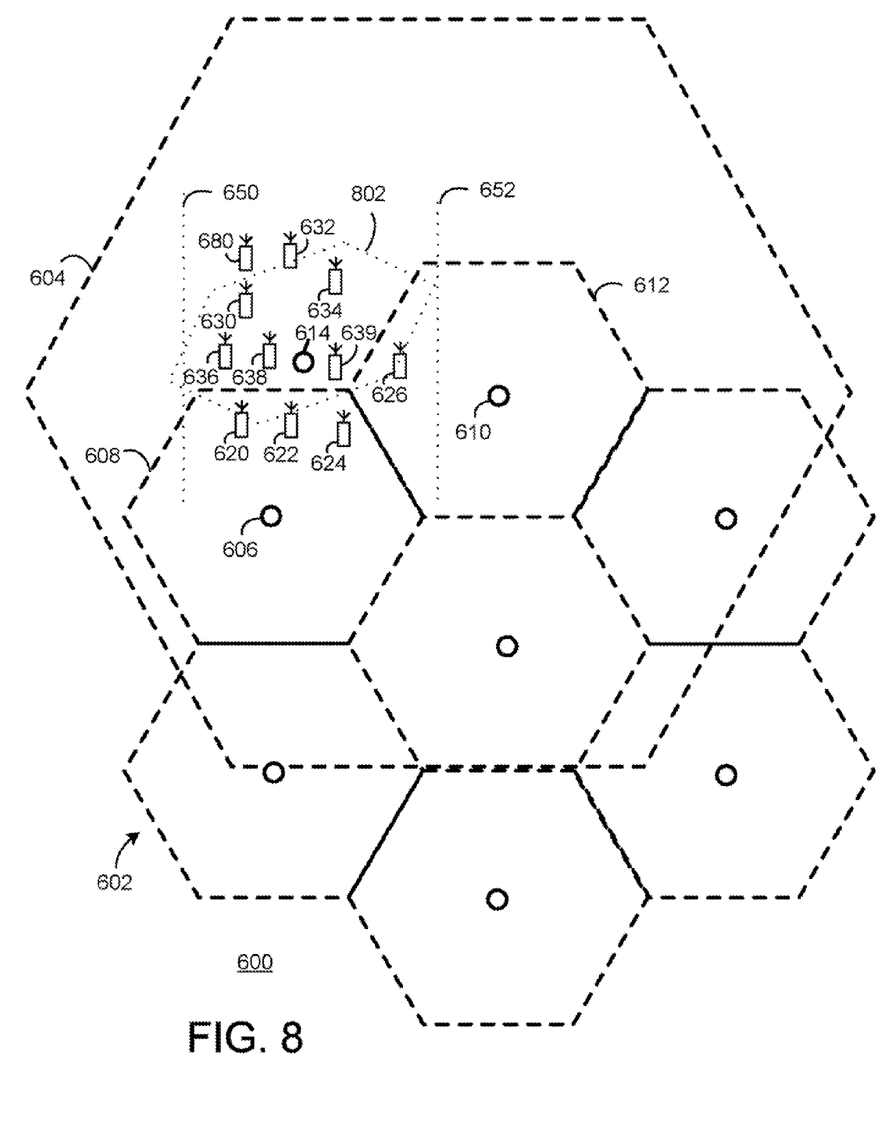
FIG. 8 is a third illustration of the WLAN where, during the configuration procedure of the wireless access point, boundaries of its RF coverage region are adjusted and set such that RF signal coverage of the first group of communication devices is minimized but RF signal coverage of the second group of communication devices is maximized.

FIG. 8 shows a suitable RF coverage region 802 of wireless AP 614 as a result of such transceiver parameter adjustment. As illustrated, the boundaries of RF coverage region 802 have been adjusted and set so as to minimize RF signal coverage for first group of mobile devices 620, 622, 624, 626, 632, and 680 (locations of undesired AP tripwire coverage) while maximizing RF signal coverage for second group of mobile devices 630, 634, 636, 638, and 639 (locations of desired AP tripwire coverage). In this example, wireless AP 614 now fails to provide adequate RF coverage for mobile devices 620, 622, 624, 626, 632, and 680 while adequately providing RF coverage for mobile devices 630, 634, 636, 638, and 639. RF coverage region 802 overlaps with a small portion of the RF coverage region of WLAN 600 as well as a small portion of RF coverage region 604 of the WWAN.

RF coverage region 802 shown in FIG. 8 is merely an example. As apparent, it may be desirable that RF coverage region 802 extend outside the RF coverage region of WLAN 600 by some predetermined distance or area. In this case, some of second group of mobile devices 630, 634, 636, 638, and 639 may be alternatively designated as devices for which RF coverage region 802 of wireless AP 614 should not be provided. For example, it may be desirable to designate mobile devices 630 and 634 in particular as devices which should not be provided RF coverage by wireless AP 614. That is, mobile devices 636, 638, and 639 just outside the boundary of the RF coverage region of WLAN 600 may remain designated as being part of the second group of mobile devices (i.e. AP tripwire coverage desired), while mobile devices 630, and 634 far outside the boundary may be included as being part of the first group of mobile devices (i.e. no AP tripwire coverage desired). More generally, mobile devices located within a first distance inside and outside of the RF coverage boundary of WLAN 600 may be included within the group of mobile devices to be within the resulting RF coverage region of wireless AP 614, but mobile devices located between the first distance and a second distance greater than the first distance inside and outside of the RF coverage boundary of WLAN 600 may not be included within this group. Again, the mobile device identifiers stored in the memory of wireless AP 614 are assigned or associated in advance as being part of either one group or another (e.g. the first or the second group) depending on the desired configuration.

Note again that other adjacent interior wireless APs (e.g. wireless APs 606 and 610) may be adapted similarly to configure and adjust boundaries of its associated RF coverage regions, so as to fill in resulting holes or gaps in RF coverage in response to the resulting RF coverage region of wireless AP 614. This may be done in order to minimize false handoffs for mobile devices.

Figure 9:
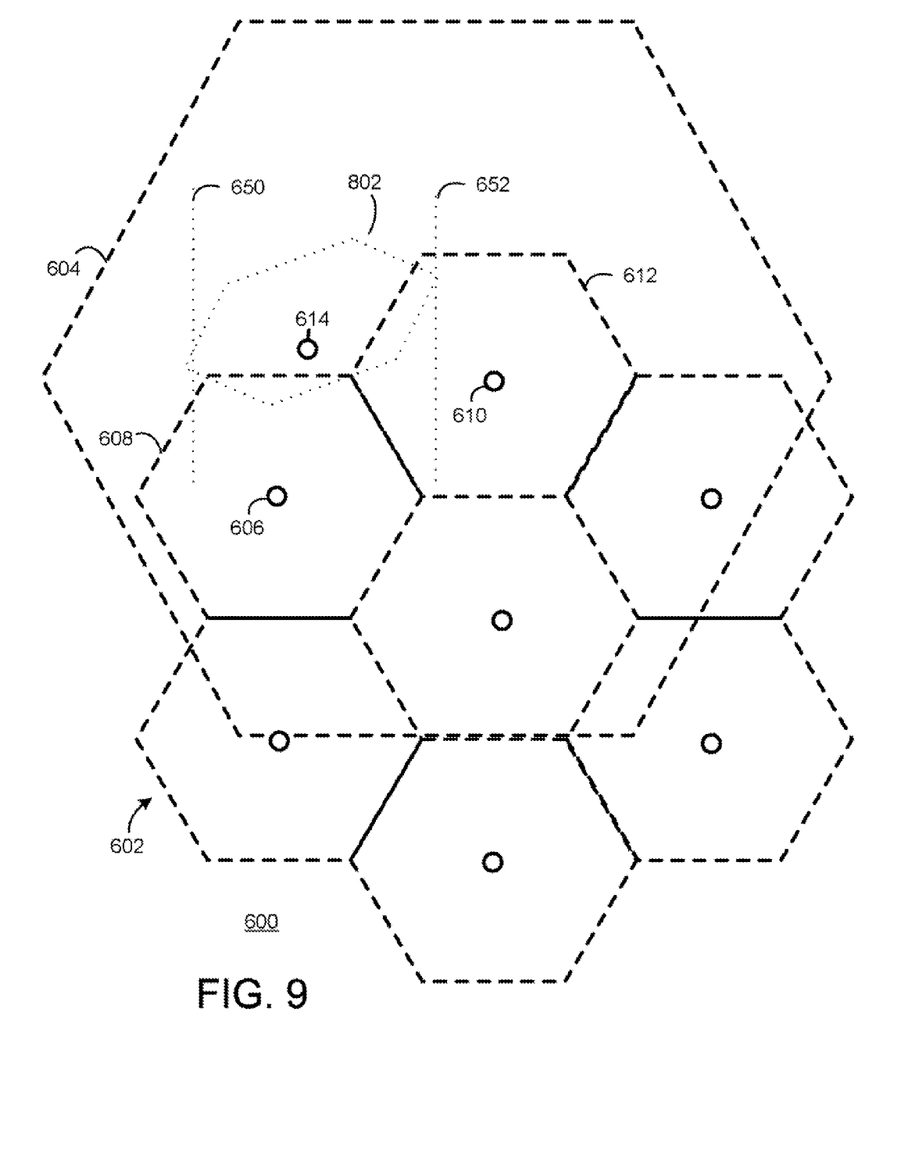
FIG. 9 is the fourth and final illustration of the WLAN where the boundaries of the RF coverage region of the wireless access point are set for use as a handoff indication mechanism in the WLAN.

FIG. 9 shows RF coverage region 802 of wireless AP 614 after the configuration procedure where the first and the second group of mobile devices are removed and the wireless AP 614 may be utilized as the handoff indication mechanism in WLAN 600. In one embodiment, RF coverage region 802 of wireless AP 614 is set and remains fixed during operation of wireless AP 614 in the handoff indication mode. After the configuration procedure, and during steady-state operation of wireless AP 614, wireless AP 614 operates in what is referred to as a "handoff indication" mode of operation. When a mobile device is within an RF coverage region 802 of wireless AP 614, it is likely that the mobile device will be exiting or entering the RF coverage of WLAN 600. If the mobile device is exiting WLAN 600, then it may need to be handed-off to the WWAN in RF coverage area 604. Therefore, when the mobile device is within RF coverage region 802, wireless AP 614 causes a handoff indication to be sent to the mobile device, to WLAN 600, or to both, in order to assist in providing a more reliable and timely vertical handoff for the mobile device to the WWAN. Since it has gone through a configuration procedure, wireless AP 614 has an RF coverage region 802 that is suitably configured to reduce the likelihood that wireless AP 614 will cause a handoff indication to be sent wrongfully (e.g. false detection) or prematurely. RF coverage region 802 is also suitably configured so that wireless AP 614 will not cause the handoff indication to be provided too late (i.e. after the handoff procedure has been or should have been initiated) but rather indeed to serve the purpose of providing adequate forewarning.

In another embodiment of FIG. 9, RF coverage region 802 of wireless AP 614 is initially set but may change from time to time during steady-state operation of wireless AP 614 in the handoff indication mode. In particular, RF coverage region 802 may be automatically adjusted in response to feedback from WLAN 600. This feedback may be, for example, an indication of the success or failure rate of mobile device handoffs from the WLAN to the WWAN. In this case, RF coverage region 802 may be adjusted so as to expand outwards from the RF coverage boundary of WLAN 600 to increase the success rate of mobile device handoffs. The feedback may also be an indication of false detect rates where RF coverage region 802 may be adjusted to provide less overlap with RF coverage of WLAN 600. As another example, the feedback may be an indication that the RF coverage boundary of WLAN 600 has been changed. In this case, boundaries of RF coverage region 802 of wireless AP 614 may be adjusted in accordance with the change in the RF coverage boundary of WLAN 600.

Figure 5:
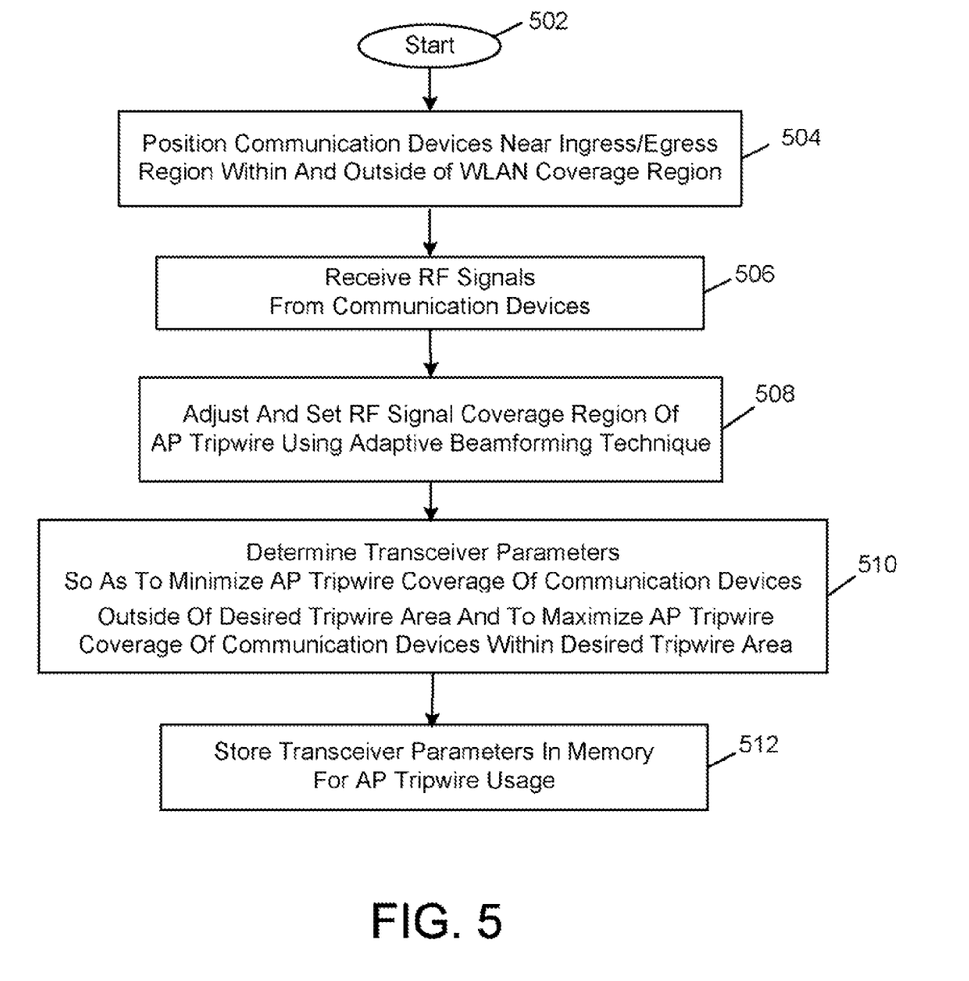
FIG. 5 is a flowchart for describing a method for use in configuring the wireless access point for use as the handoff indication mechanism in the WLAN.

Referring now back to FIG. 5, a flowchart of a method of configuring the wireless AP for use as the handoff indication mechanism in the WLAN is shown. The following description of FIG. 5 relates to the description of FIGS. 6-9 above. The method of FIG. 5 may be embodied at least in part as a computer program product which includes a computer readable medium and computer instructions stored in the computer readable medium which are executable by one or more processors of the wireless AP for performing the method. After its initiation, the technique is performed automatically by the one or more processors without further user intervention. After the configuration procedure, the wireless AP operates with use of configured wireless transceiver parameters in a normal, steady-state mode of operation as the AP tripwire of the WLAN.

Beginning at a start block 502 of FIG. 5, a plurality of communication devices for the configuration procedure are provided and fixedly positioned around the ingress/egress region of the WLAN (step 504 of FIG. 5). As described earlier above, in one approach, the communication devices are mobile devices which have the same or similar structure and functionality as mobile terminal 138 of FIG. 2 and are operational for end users as ordinary mobile communication devices. In another approach, the communication devices are specially-designed configuration devices which are not operational for end users as ordinary mobile communication devices. In the present example, the communication devices are mobile devices.

In step 504, a first group of mobile devices are positioned at locations of undesired RF coverage for the AP tripwire, outside of an RF coverage boundary of a WLAN coverage region of one or more other wireless access points of the WLAN. On the other hand, a second group of mobile devices are positioned at locations of desired RF coverage for the AP tripwire, around the RF coverage boundary of the WLAN coverage region as well as within the WWAN coverage region. See the previous description in relation to FIG. 7. The positioning of the mobile devices is performed by one or more individuals, with or without the assistance of any other WLAN feedback signal mechanisms if necessary.

After mobile device positioning, radio frequency (RF) signals from the mobile devices are received by the wireless AP (step 506 of FIG. 5). Such communications may be performed for a particular frequency or frequency pair of the relevant RF band of interest for RF communications, and alternatively for two or more frequencies of the RF band in wideband environments (e.g. OFDM systems). Note also that some of the mobile devices also receive RF signals to and from other "interior" wireless APs (e.g. wireless APs 606 and 610) when their positioning allows for it.

Next, an RF signal coverage region of the wireless AP is automatically adjusted and set based on the RF signals using an adaptive beamforming technique, and preferably based on a minimax optimization (step 508 of FIG. 5). Specifically, transceiver parameters of the wireless transceiver array of the wireless AP are adjusted and set such that RF signal coverage of the first group of mobile devices is minimized (locations of undesired AP tripwire coverage) but RF signal coverage of the second group of mobile devices is maximized (locations of desired AP tripwire coverage) (step 510 of FIG. 5).

The RF signals from each mobile device may include a mobile device identifier which uniquely identifies the mobile device, amongst other data. Mobile device identifiers may also be stored in memory of the wireless AP, and assigned or associated in advance with an indication corresponding to either one group (e.g. desired AP tripwire coverage) or another group (e.g. no desired AP tripwire coverage). The wireless AP may determine which RF signals should be maximized or minimized based on the mobile device identifier associated with the RF signal and the indication (received and/or stored in memory) of whether the mobile device should or should not be within the AP tripwire coverage.

Once the transceiver parameters are obtained, they are stored in memory for use by the wireless AP tripwire (step 512 of FIG. 5). Again, this procedure may be performed once for a particular frequency of the RF band of interest for some systems, or alternatively may be repeated for multiple frequency channels (e.g. each and every frequency channel) utilized between the wireless AP and mobile devices, assuming some frequency dependence on the communication of RF signals in the relevant RF band of interest.

Thus, methods and apparatus for use in configuring a wireless access point (AP) which serves as a handoff indication mechanism ("AP tripwire") in a wireless local area network (WLAN) for mobile device handoffs between the WLAN and a wireless wide area network (WWAN) have been described. During a configuration procedure for the wireless AP, radio frequency (RF) signals transmitted from a plurality of communication devices are received by the wireless AP. The plurality of communication devices includes a first group of communication devices positioned at locations of undesired RF coverage outside of an RF coverage boundary of a WLAN coverage region of one or more other wireless APs of the WLAN, as well as a second group of communication devices positioned at locations of desired RF coverage around the RF coverage boundary of the WLAN coverage region and within the WWAN coverage region. Based on the received RF signals, wireless transceiver parameters of the wireless AP are automatically determined and set to adjust boundaries of an RF coverage region of the wireless AP, such that RF signal coverage of the first group of communication devices is minimized but RF signal coverage of the second group of communication devices is maximized. Preferably, the wireless transceiver parameters are determined and set through use of an adaptive beamforming technique (e.g. a minimax optimization) which is performed automatically by the wireless AP during the configuration procedure without user intervention. After the configuration procedure, the wireless AP operates with use of the configured wireless transceiver parameters in a normal, steady-state mode of operation as the AP tripwire of the WLAN. Advantageously, the RF signal coverage of the AP tripwire is appropriately adjusted and set so as to help provide reliable and timely mobile device handoffs between the WLAN and the WWAN.

A wireless access point of the present disclosure includes an antenna array, a wireless transceiver array coupled to the antenna array, and one or more processors which are coupled to the wireless transceiver array. The one or more processors are adapted to operate in a handoff indication mode in a wireless local area network (WLAN) for mobile device handoff between the WLAN and a wireless wide area network (WWAN). The one or more processors are further adapted to operate in a configuration mode to receive, by the wireless transceiver array, radio frequency (RF) signals from a plurality of communication devices, and to subsequently adjust and set wireless transceiver parameters of the wireless transceiver array for adjusting boundaries of an RF coverage region of the wireless access point. The plurality of communication devices include a first group of communication devices positioned at locations of undesired RF coverage outside of an RF coverage boundary of a WLAN coverage region of one or more other wireless access points of the WLAN. The plurality of communication devices also include a second group of communication devices positioned at locations of desired RF coverage around the RF coverage boundary of the WLAN coverage region and within the WWAN coverage region. The parameters of the wireless transceiver are determined and set so that RF signal coverage of the first group of communication devices is minimized but RF signal coverage of the second group of communication devices is maximized.

A wireless local area network (WLAN) of the present disclosure includes a plurality of wireless access points which define a WLAN radio frequency (RF) coverage region for wireless communications in the WLAN. The WLAN further includes a unique wireless access point which is operative to serve as a handoff indication mechanism in the WLAN for mobile device handoff between the WLAN and a wireless wide area network (WWAN). The wireless access point includes an antenna array, a wireless transceiver array coupled to the antenna array, and one or more processors which are coupled to the wireless transceiver array. The one or more processors are adapted to operate in a handoff indication mode in the WLAN for mobile device handoff between the WLAN and the WWAN. The one or more processors are further adapted to operate in a configuration mode to receive, by the wireless transceiver array, RF signals from a plurality of communication devices, and to subsequently adjust and set parameters of the wireless transceiver array for adjusting boundaries of an RF coverage region of the wireless access point. The plurality of communication devices include a first group of communication devices positioned at locations of undesired RF coverage outside of an RF coverage boundary of a WLAN coverage region of one or more other wireless access points of the WLAN. The plurality of communication devices also include a second group of communication devices positioned at locations of desired RF coverage around the RF coverage boundary of the WLAN coverage region and within the WWAN coverage region. The parameters of the wireless transceiver array are determined and set so that RF signal coverage of the first group of communication devices is maximized but RF signal coverage of the second group of communication devices is minimized.

The above-described embodiments of the present disclosure are intended to be examples only. In the present disclosure, the examples described were directed to WLANs of the IEEE 802.11 network type and WWANs of the cellular network type. However, the WLAN and WWANs may be any suitable heterogeneous networks. For example, one of the networks may be a WiMAX (e.g. 802.16-based) network. If the WLAN is a WiMAX network, for example, then the WWAN may be a cellular telecommunications network. Also for example, if the WWAN is a WiMAX network, then the WLAN may be an IEEE 802.11-based network. Those of skill in the art may effect alterations, modifications and variations to the embodiments without departing from the scope of the application.

What is claimed is:

1. A method performed by a wireless access point when positioned in an ingress or egress region of a wireless local area network (WLAN), the method comprising:
    sending a handoff indication to a mobile device or to the WLAN or to both when the mobile device is within a coverage region of the wireless access point; and
    responsive to handoff feedback that indicates too many failed handoffs of mobile devices between the WLAN and a wireless wide area network, extending the coverage region outwards from a coverage region of the WLAN.

2. The method as recited in claim 1, wherein extending the coverage region comprises applying an adaptive beam forming technique.

3. The method as recited in claim 1, wherein extending the coverage region comprises adjusting parameters of a wireless transceiver array of the wireless access point.

4. A method performed by a wireless access point when positioned in an ingress or egress region of a wireless local area network (WLAN), the method comprising:
    sending a handoff indication to a mobile device or to the WLAN or to both when the mobile device is within a coverage region of the wireless access point; and
    responsive to handoff feedback that indicates that the wireless access point has, wrongfully, sent too many handoff indications to mobile devices that were positioned away from the ingress or egress region, contracting the coverage region to overlap less with a coverage region of the WLAN.

5. The method as recited in claim 4, wherein contracting the coverage region comprises applying an adaptive beam forming technique.

6. The method as recited in claim 4, wherein contracting the coverage region comprises adjusting parameters of a wireless transceiver array of the wireless access point.

7. A wireless access point comprising:
    an antenna array;
    a wireless transceiver array coupled to the antenna array; and
    one or more processors which are coupled to the wireless transceiver array, the one or more processors being configured, when the wireless access point is positioned in an ingress or egress region of a wireless local area network (WLAN), to operate the wireless access point to:
        send a handoff indication to a mobile device or to the WLAN or to both when the mobile device is within a coverage region of the wireless access point; and
        extend the coverage region outwards from a coverage region of the WLAN responsive to handoff feedback that indicates too many failed handoffs of mobile devices between the WLAN and a wireless wide area network.

8. The wireless access point as recited in claim 7, wherein the one or more processors are further configured to operate the wireless access point to extend the coverage region by applying an adaptive beam forming technique.

9. The wireless access point as recited in claim 7, wherein the one or more processors are further configured to operate the wireless access point to extend the coverage region by adjusting parameters of the wireless transceiver array.

10. A wireless access point comprising:
    an antenna array;
    a wireless transceiver array coupled to the antenna array; and
    one or more processors which are coupled to the wireless transceiver array, the one or more processors being configured, when the wireless access point is positioned in an ingress or egress region of a wireless local area network (WLAN), to operate the wireless access point to:
        send a handoff indication to a mobile device or to the WLAN or to both when the mobile device is within a coverage region of the wireless access point; and
        contract the coverage region to overlap less with a coverage region of the WLAN, responsive to handoff feedback that indicates that the wireless access point has, wrongfully, sent too many handoff indications to mobile devices that were positioned away from the ingress or egress region.

11. The wireless access point as recited in claim 10, wherein the one or more processors are further configured to operate the wireless access point to contract the coverage region by applying an adaptive beam forming technique.

12. The wireless access point as recited in claim 10, wherein the one or more processors are further configured to operate the wireless access point to contract the coverage region by adjusting parameters of the wireless transceiver array.

13. A non-transitory computer readable medium storing computer instructions which, when executed by one or more processors of a wireless access point positioned in an ingress or egress region of a wireless local area network (WLAN), result in:
    sending a handoff indication to a mobile device or to the WLAN or to both when the mobile device is within a coverage region of the wireless access point; and
    extending the coverage region outwards from a coverage region of the WLAN responsive to handoff feedback that indicates too many failed handoffs of mobile devices between the WLAN and a wireless wide area network.

14. A non-transitory computer readable medium storing computer instructions which, when executed by one or more processors of a wireless access point positioned in an ingress or egress region of a wireless local area network (WLAN), result in:
    sending a handoff indication to a mobile device or to the WLAN or to both when the mobile device is within a coverage region of the wireless access point; and
    contracting the coverage region to overlap less with a coverage region of the WLAN, responsive to handoff feedback that indicates that the wireless access point has, wrongfully, sent too many handoff indications to mobile devices that were positioned away from the ingress or egress region.

* * * * *